United States Patent [19]
Zhu

[11] Patent Number: 5,594,595
[45] Date of Patent: Jan. 14, 1997

[54] FM DETECTION OF SLIDER-DISK INTERFACE

[75] Inventor: Li-Yan Zhu, San Jose, Calif.

[73] Assignee: Conner Peripherals, Inc., San Jose, Calif.

[21] Appl. No.: 374,052

[22] Filed: Jan. 19, 1995

[51] Int. Cl.⁶ ................................................ G11B 27/36
[52] U.S. Cl. ........................ 360/31; 360/75; 360/103; 360/73.03; 324/226
[58] Field of Search ............................... 360/31, 75, 102, 360/103, 73.03; 324/212, 207.26, 210, 226, 207.23, 262

[56] References Cited

U.S. PATENT DOCUMENTS

| | | | |
|---|---|---|---|
| 4,777,544 | 10/1988 | Brown | 360/103 |
| 4,823,203 | 4/1989 | Narusawa | 360/73.03 |
| 4,841,389 | 6/1989 | Hoyt | 360/103 |
| 5,168,413 | 12/1992 | Coker | 360/75 |
| 5,265,081 | 12/1993 | Shimizume et al. | 360/73.03 |
| 5,377,058 | 12/1994 | Good et al. | 360/75 |
| 5,410,439 | 4/1995 | Egbert | 360/75 |
| 5,412,519 | 5/1995 | Buettner | 360/73.03 |

OTHER PUBLICATIONS

Digital Signal Processing with Computer Applications, by Paul A. Lynn et al, p. 67, published 1989.

*Primary Examiner*—Aristotelis Psitos
*Assistant Examiner*—Alan Faber
*Attorney, Agent, or Firm*—Flehr, Hohbach, Test, Albritton & Herbert

[57] ABSTRACT

A method for testing slider/disk contact in a disk drive is described. The disk drive comprises a rotating disk and a head mounted by an actuator for selective positioning of the head over the disk, the head having a slider, and a flexure for attaching the head to the actuator. The method includes the steps of rotating the disk of the disk drive at a first preselected rotational velocity, using the head of the disk drive to write a signal having a substantially uniform pattern on the disk as it rotates, thereafter rotating the disk at a second preselected rotational velocity, while rotating the disk at the second preselected rotational velocity, using the head to read back the signal written at the first preselected rotational velocity, and performing an FM demodulation of the read back signal through a frequency range corresponding to a range of natural frequencies of vibration of the flexure caused by slider/disk contact.

27 Claims, 3 Drawing Sheets

FM DETECTION OF SLIDER-DISK INTERFACE

FIELD OF THE INVENTION

The present invention is directed to disk drives. More particularly, the present invention provides an efficient and reliable system and method for detecting the take off velocity for a slider in the disk drive.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks that extend circumferentially around the disk. Each data track can store data in the form of magnetic transitions on the disk surface.

The disk drive further comprises an interactive element, such as a magnetic transducer, that is used to sense the magnetic transitions to read data, or to conduct an electric current that causes a magnetic transition to write data. The magnetic transducer includes a read/write gap that positions the active elements of the transducer at a position suitable for interaction with the magnetic surface of the disk.

The disk drive also includes a slider that mounts the transducer to a rotary actuator arm, typically via a flexure element arranged between the slider and actuator arm to accommodate movement of the head during operation of the drive. The actuator arm operates to selectively position the head, including the transducer and slider, over a preselected data track of the disk to either read data from or write data to the preselected data track of the disk, as the disk rotates below the transducer.

In modern disk drives, the slider is configured to include an air bearing surface that causes the head, and thus the transducer, to fly above the data tracks of the disk surface due to interaction between the air bearing surface of the slider and fluid currents that result from the rotation of the disk. The amount of distance that the transducer flies above the disk surface is referred to as the "fly height." As should be understood, due to operation of the air bearing surface, the transducer does not physically contact the disk surface during normal read and write operation of the disk drive to minimize wear during operation of the drive.

The fly height for a slider refers to the height reached by the slider when the disk is rotating at its operational rotational velocity, i.e. the number of rotations per minute (rpm's) at which the disk drive was designed to operate. The fly height is designed to be at a level sufficient to insure that the transducer is spaced from the disk surface a distance suitable to maintain negligible contact between the head and disk surface during normal disk operation. In any disk drive product, the surfaces of the disks are typically not perfectly smooth and flat. There are peaks and valleys formed on the disk surface. The design fly height should be sufficient, e.g. to generally avoid head/disk contact, despite the passage of disk surface peaks below the head.

When the disk drive is not operating, the rotation of the storage disk is stopped, and the air bearing surface of the head does not act to cause the transducer to fly. Under such circumstances, the head, including the transducer, comes to rest on the disk surface. Typically, the actuator is operated prior to power down of the disk drive, to position the head over a landing zone provided on the disk surface at a location spaced away from any of the data tracks.

In a known contact stop operation of a disk drive, at power down of the drive, the fly height of the head gradually decreases as the rotational velocity slows, until the head comes into contact with the disk surface at the landing zone. The rotational velocity of the disk at which a head first contacts a disk surface is referred to as the "landing" velocity. Thereafter, the head remains in contact with the disk surface until and after rotation of the disk comes to a complete stop. The use of a landing zone prevents any damage to data tracks that may occur due to contact between the head and the disk surface. However, any contact between the head and the disk surface may result in damage to the transducer, and, in any event, contributes to wear of the head and disk surface.

This is also true when the disk drive is started again in a contact start operation. A contact start operation causes the commencement of rotation of the disk while the head is still in contact with the landing zone. The head remains in contact with the disk surface during acceleration of the disk, until the rotational velocity of the disk reaches a "take-off" velocity. The take-off velocity is the rotational velocity of the disk at which the air bearing surface first acts to lift the head from the disk surface such that contact between the slider and the disk surface is negligible. The take-off velocity is approximately equal to the landing velocity.

It is a goal of disk drive manufacturers to limit wear caused by contact between the head and disk surface, particularly during contact stop and start operations, to assure a more reliable mechanical performance of the disk drive. To that end, disk drive designs seek to accomplish disk drive operation wherein a head commences flying operation within an acceptable margin of rotational velocity measured from the operational rotational velocity for the disk.

For example, it has been determined that mechanical performance for a particular drive is likely to be acceptable for a relatively long work life when the head lifts off from and lands on the disk surface at a rotational velocity equal to approximately seventy per cent of the operational rotational velocity of the drive. In general, the fly height of a head is proportional to the rotational velocity of the disk, once the take-off velocity has been reached. In other words, the faster the disk is spinning, the higher the fly height of the head. It has been found that if flying operation (the take-off velocity) for a head is achieved by, e.g., seventy per cent of the operational velocity, the desired fly height should be reached by the head when the disk is accelerated up to the operational velocity. If the take-off velocity is greater than seventy per cent of the operational velocity, there is a significant likelihood that the head does not reach the desired fly height when the disk is accelerated to the operational velocity, leading to excessive wear and premature mechanical failure of the disk drive.

In addition, when the take-off or landing velocity is greater than seventy per cent of the operational velocity, the head remains in contact with the disk surface (i.e. the total sliding distance of the head on the disk surface during either a contact start or stop operation) for a total length of disk surface that is likely to result in excessive wear of the head/disk interface.

During manufacture of disk drives, it is desirable to be able to test each individual disk drive to determine the take-off and/or landing velocity for each head in the drive as a quality control procedure to insure that each head in the disk drive is operating to lift off from or land on the disk surface with a minimal sliding distance, and, in a contact start operation, is operating to reach the design fly height at the operational rotational velocity of the disk. However, there is not presently available a reliable and efficient system or method to determine take-off velocity values on a drive-by-drive basis, particularly for disk drives having multiple disks and heads.

Previous proposals involve recording a signal having a known frequency on a preselected track of the disk while the disk is rotating at a preselected rotational velocity and then reading back the signal at one or more different rotational velocities of the disk, including a rotational velocity corresponding to an expected take-off velocity. Contact between the slider and disk surface affects the signal read back from the disk. Knowledge of how the read back signal is affected can be applied to analyze the signal for evidence of slider/disk contact. The analysis can include frequency or amplitude demodulation of the read back signal for indications of slider/disk contact, and, e.g., measurement of the rotational velocity at which the read back signal first indicates slider/disk contact. Such a velocity measurement will generally correspond to the take-off velocity of the particular slider.

The methods and apparatuses described in the previous proposals suffer from shortcomings such as limited bandwidth for effective demodulation of the read back signal, time consuming procedures for implementation, particularly in disk drives having multiple heads and poor signal-to-noise ratios diminishing the accuracy and sensitivity of the detection process.

SUMMARY OF THE INVENTION

The present invention provides a system and method for accurately and efficiently detecting the take-off velocity for each head in a disk drive product during manufacture of the product. The invention is based upon knowledge that one of the effects of slider/disk contact is frequency jitter in the read back signal. The invention recognizes that frequency jitter results from many causes, many of which are unrelated to slider/disk contact. Accordingly, the invention implements a method for detecting take-off velocity by utilizing frequency modulation (FM) and spectrum analysis to detect and analyze frequency jitter specifically caused by slider/disk contact.

Frequency jitter refers to variations in the frequency of the read back signal caused by, e.g., mechanical vibrations resulting from contact between the head slider and disk surface or other mechanical vibrations of the head and actuator. By performing a frequency demodulation of the read back signal and analyzing signal strengths at the various frequencies of the frequency spectrum obtained from the demodulation, information regarding frequency jitter of a type ordinarily caused by slider/disk contact can be ascertained.

The present invention can be implemented in an efficient and straightforward test system comprising a conventional FM demodulator having an input coupled to a disk drive device under test and an output coupled to a frequency spectrum analyzer. According to a feature of the present invention, the frequency range of the demodulation is set to encompass frequencies at which jitter is most likely to be caused by slider/disk contact. The use of a conventional FM demodulator facilitates implementation of the present invention by utilizing readily available equipment. Moreover, the use of an FM demodulator provides improved bandwidth and signal-to-noise ratios during operation of the test system.

The frequency spectrum analyzer can comprise, e.g., a conventional spectrum analyzer or a processor performing a Fourier transformation of the demodulated read back signal. A frequency spectrum analysis over the bandwidth demodulated by the FM demodulator insures detection of frequency jitter caused by various modes of vibration due to head/disk contact. This is particularly effective because vibration modes indicative of contact are often unpredictable, due to manufacturing tolerances.

According to the method aspects of the present invention, the device under test is operated to spin the disk or disks of the device at each of two rotational velocities selected to provide an operating environment that is representative of take-off conditions. For example, the first rotational velocity can be the intended operational velocity of the disk drive and the second rotational velocity can be the desired take-off velocity for reliable, long term mechanical performance.

A periodic signal having a preselected frequency is recorded by the head on the disk of the device under test while the disk drive is operated at one of the two rotational velocities. The device under test is then operated at the other of the two rotational velocities, and the head is used to read back the recorded signal. The read back signal is input to the FM demodulator for frequency demodulation of the read back signal. The output of the FM demodulator is then input to the frequency spectrum analyzer for analysis of signal strengths at frequencies throughout the frequency range demodulated by the FM demodulator.

If peak heights of the frequency signals processed by the spectrum analyzer are all below a certain threshold envelope across the frequency spectrum, this will indicate that the slider has lifted the head at both rotational velocities since there is no evidence of frequency jitter as would be caused by slider/disk contact. Accordingly, it will be determined that the head in the device under test operates to commence flying operation by at least the desired take-off velocity for the drive, and, will, therefore, continue to lift to the desired fly height by time the disk is accelerated to the operational velocity of the disk.

If peaks are detected having signal strength values above the threshold envelope, then it will be determined that the head has not lifted from the disk surface by the desired take-off velocity for the device under test. The device is then rejected and returned to appropriate personnel for rework or repair.

If there is more than one head in the device under test, the method according to the present invention is repeated for each head/disk pair in the device. The method of the present invention is particularly efficient for disk drives having multiple heads because there is no need to cycle between speeds of rotation for the disks of the disk drive. All of the heads can be operated, in turn, to write a periodic signal while the disks are rotating at the first rotational velocity. Thereafter, the disks can be rotated at the second rotational velocity, and all of the heads can be operated, in turn, to read back the signal.

Moreover, the take-off velocity test can be performed at an early stage in the assembly of the disk drive product, after the head disk assembly is completed, but before assembly of the electronics and sealing of the drive in its housing. Accordingly, the take-off velocity characteristics of each product is determined at a point in the manufacturing process at which rework or repair can be more conveniently performed in the event of test failure.

The method of the present invention can also be used as a laboratory test during a disk drive design and development project. In a laboratory mode, the FM demodulation and frequency analysis can be used to observe the nature and pattern of slider/disk contact by analyzing the frequencies and signal strengths shown in the output of the spectrum analyzer. Moreover, the deterioration the slider/disk interface due to contact can be observed by continuously monitoring and analyzing variations in the FM output of read back signals.

DETAILED DESCRIPTION

Figure 1:
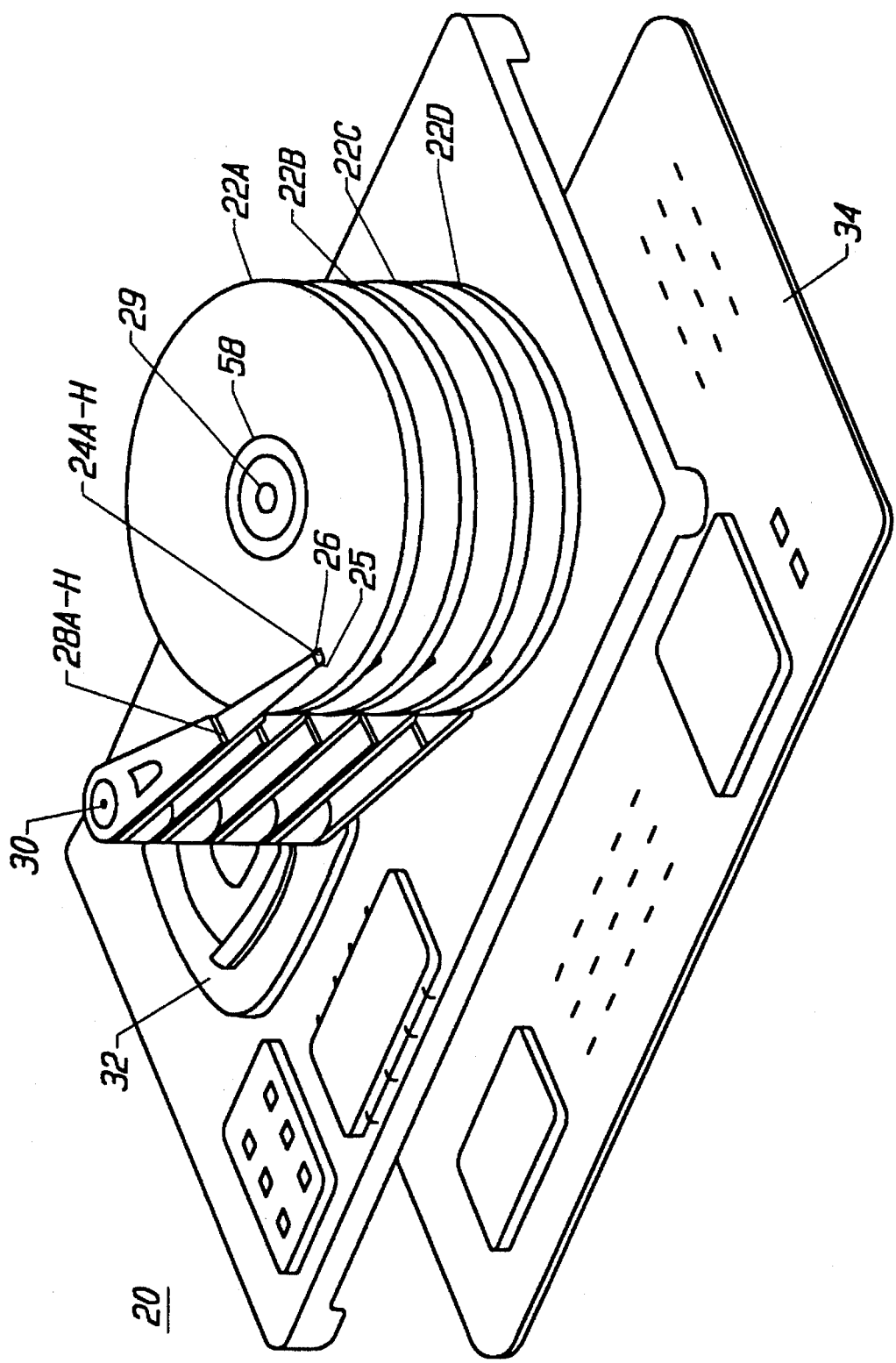
FIG. 1 is perspective view of an exemplary disk drive.

Referring now to the drawings, and initially to FIG. 1, there is illustrated an example of a disk drive designated generally by the reference numeral 20. The disk drive 20 includes a plurality of storage disks 22a–d and a plurality of read/write heads 24a–hEach of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented for use in connection with a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58, where the read/write heads 24a–h come to rest on the storage disk surfaces. As should be understood, each of the read/write heads 24a–h is at rest on a respective landing zone 58 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
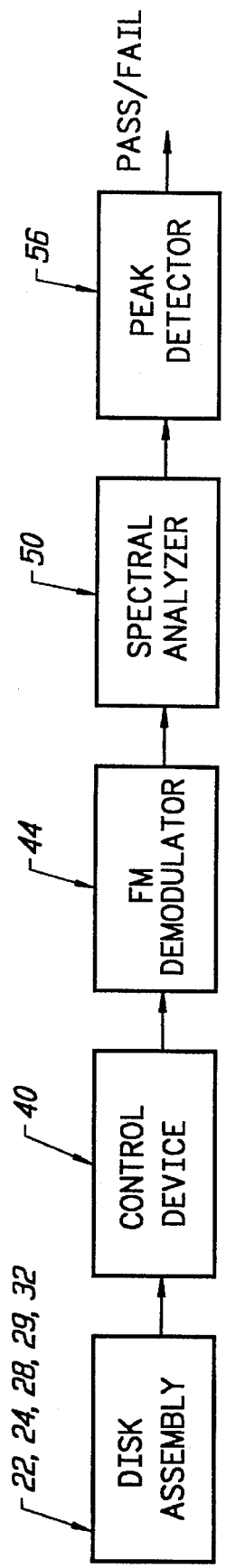
FIG. 2 is a block diagram of a test system according to the present invention.

According to an exemplary take off velocity test method implementing the present invention, prior to assembly and coupling of the PCB 34, the assembly of actuator arms 28a–h, with heads 24a–h, voice coil motor 32, storage disks 22a–d and spindle motor 29 is coupled to a test system as a device under test, as illustrated in FIG. 2, to determine the take-off velocity of each of the heads 24a–h. A control device 40 simulates the PCB 34 to operate the assembly under test. More particularly, the control device 40 is coupled to the assembly in place of the PCB 34 to control operation of the spindle motor 29 and voice coil motor 32, and includes read/write channel circuitry to cause the heads 24a–h to read or write signals from or to the surfaces of the storage disks 22a–d.

As generally known in the art, the control device is provided with a multiplexer (not shown) to select any one of the heads 24a–h at a time for control to either read or write signals from or to the respective disk surface.

The control device 40 includes an output coupled to an input of an FM demodulator 44. The control device output operates to transmit signals read by a selected one of the read/write heads 24a–h to the FM demodulator 44. The FM demodulator 44 can comprise a conventional FM demodulator, as commonly used in FM radios, modified to receive a frequency bandwidth appropriate to disk drive jitter frequencies, or a laboratory instrument, such as, e.g., an HP 8901A Modulation Analyzer. The FM demodulator 44 includes an output to output signals of various frequencies demodulated from the signal read back by a selected head 24a–h.

A spectrum analyzer 50 includes an input coupled to the output of the FM demodulator 44 to receive the demodulated frequency signals. The spectrum analyzer 50 operates to provide signal strength information for each of the frequencies demodulated by the FM demodulator 44. The spectrum analyzer can comprise a conventional frequency spectrum analyzer or a processor performing a Fourier transformation of the received demodulated frequency signals. For most efficient operation, a fast Fourier transformation algorithm is implemented in the processor, as will be described in more detail below.

An output of the spectrum analyzer 50 is coupled to a peak detector 56 arranged to detect peak values that are above a threshold envelope encompassing a value or values of signal strength indicative of head/disk contact, from the signal strength information generated by the spectrum analyzer 50. The peak detector 56 operates to output a pass/fail indication for the device under test, based upon detection of peaks above any value encompassed within the threshold envelope, as will appear. Any peak value above a threshold value indicates slider/disk contact.

According to the exemplary test method of the present invention, the control device 40 is operated to cause the voice coil motor 32 to position the actuator arms 28a–h over a preselected radius of the storage disks 22a–d, e.g. the inner or outer diameter regions of the disk used in contact start or stop operations. The particular radius chosen depends on the sensitivity of frequency of a read back signal due to head/disk contact.

The sensitivity of frequency of a read back signal is affected by several factors most notably, the magnitude and direction of mechanical vibrations caused by the contact. These factors vary as a function of the particular structures and construction of the mechanical components comprising the head, flexure and other suspension elements mounting the head to an actuator arm.

Initially, the sensitivity of read back frequency to head/disk contact can be determined experimentally for a particular head. For certain presently used sliders and suspensions, such as a two-rail nano slider and type 19 suspensions manufactured by Hutchinson, it has been found that the sensitivity is greatest when the skew angle between a head and disk is greatest. In most rotary actuators of the type illustrated in FIG. 1, the greatest skew angle occurs when the actuator arms 28a–h position the heads 24a–h at the outer rim of the storage disks 22a–d.

Once a radius is selected and the control device 40 operates to cause the voice coil motor 32 to position the actuator arms 28a–h at the preselected radius of the respective storage disks 22a–d, the control device 40 controls the spindle motor 29 to rotate the storage disks 22a–d at a first preselected rotational velocity. While rotating at the first rotational velocity, the control device 40 utilizes the multiplexer to sequentially activate each of the heads 24a–h, to write, in turn, a signal having a substantially uniform pattern completely around each respective storage disk surface, at the preselected radius. The wavelength of each pattern signal as written on the respective disk surface, will be a function of the frequency of the signal provided to the head 24 by the control device 40 and the first preselected rotational velocity. The written signal will include frequency jitter if the respective activated head 24a–h is in contact with the disk surface during writing of the pattern signal. To advantage, the wavelength of the written signal is set to equal the wavelength of the high frequency signal typically used to test the magnetic performance of the heads 24a–h.

When writing the signal to each disk surface, there will typically be a discontinuity in the signal at the completion of the rotation of the disk. This is due to the fact that the wavelength of the signal does not precisely fit a whole number of cycles within the circumference of the storage disk at the preselected radius. In accordance with a feature of the present invention, the spectrum analyzer 50 is gated to omit reception of the signal form the head when it is passing over the discontinuity of the signal written on the respective disk surface, as will be described in greater detail below.

After the writing of each signal having a substantially uniform pattern completely around each respective storage disk surface, at the preselected radius, and with the actuator arms 28a–h remaining at the preselected radius of the respective storage disks 22a–d, the control device 40 then controls the spindle motor 29 to rotate the storage disks 22a–d at a second preselected rotational velocity. While rotating at the second rotational velocity, the control device 40 utilizes the multiplexer to sequentially activate each of the heads 24a–h, to read the previously written signals, one at a time. The frequency of each pattern signal as read from the disk surface, will now be a function of the second preselected rotational velocity and will include frequency jitter if the respective activated head 24a–h was in contact with the disk surface during either reading or writing of the pattern signal.

Each of the first and second rotational velocities is chosen to be at a value relevant to the take-off velocity for the heads 24a–h. For example, if the disk drive 20 is designed to operate at 7200 rpm, the signal can be written at a first rotational velocity equal to 7200 rpm. The signal can then be read back at a rotational velocity equal to approximately 70% of 7200 rpm, e.g. 5000 rpm. The method of the present invention can be implemented in an opposite order of writing and reading a signal, i.e., writing the signal at 5000 rpm and reading the signal back at 7200 rpm.

In any event, the two rotational velocities selected should provide information regarding slider/disk contact at a minimum take off velocity acceptable for the device under test. One of the rotational velocities selected should be at the desired take off velocity, and the other sufficiently higher, e.g. 10% higher (500 rpm higher in the example of a take off velocity of 5000 rpm), to eliminate any repeatable vibrations that may occur in the head at approximately equal rotational velocities. In this manner, any frequency jitter found in the read back signal will be indicative of a failure to achieve fly height operation by the desired take off velocity, as will appear.

Generally, the operation that takes longer to complete (either the write or the read) should be performed at the higher rotational velocity to reduce wear at the slider/disk interface during testing. The operation performed at the lower rotational velocity should be conducted first since spindle motor acceleration is generally faster and more robust than spindle motor deceleration. Reading at the higher rotational velocity boosts both the frequency and amplitude of slider vibration encoded in the written signal. However, reading at the lower rotational velocity reduces the required bandwidth for the FM demodulation and frequency spectrum analysis.

According to the exemplary take off velocity test method of the present invention, the signals read back by the heads 24a–h are transmitted by the output of the control device 40 to the input of the FM demodulator 44. The FM demodulator 44 may include output filters to attenuate frequency jitter unrelated to slider/disk contact. The FM demodulator 44 is operated to demodulate the read back signals, one at a time, from the heads 24a–h. The spectrum analyzer 50 is gated at the portion of the signal that contains a discontinuity to omit the influence of the discontinuity in the signal demodulation. The length of the discontinuity is short as compared to frequency jitter effects that may be caused by slider/disk contact. Accordingly, even if slider/disk first occurs at the discontinuity, the effects of jitter will persist beyond the length of the discontinuity, and will be detected by the FM demodulation.

Vibrations of the head/actuator assembly occur in various modes, including flexure modes and suspension modes. According to a feature of the present invention, the frequency range of the FM demodulation focuses upon vibrations in the flexure mode. It has been determined that flexure vibrations are less susceptible to noise, and more indicative of slider/disk contact. Other forms of vibration, e.g. suspension vibrations, can be caused by factors other than slider/disk contact, such as air turbulence and spindle vibrations. In addition, flexure vibrations occur at a higher frequency than suspension vibrations resulting in higher FM resolution of amplitude information.

Experimentation has shown that flexure modes of vibration are quiet in the absence of slider/disk contact. At the onset of slider/disk contact, one or more flexure modes of vibration increase sharply. The natural vibrations of a flexure occur over a relatively wide frequency bandwidth, which makes it difficult to isolate expected vibrations using bandpass filters. However, the close correlation between flexure modes of vibration and slider/disk contact make flexure vibration modes highly desirable as a basis for determination of slider/disk contact.

Thus, according to another feature of the present invention, the spectrum analyzer 50 is coupled to the FM demodulator 44 to receive the FM demodulated read back signals, one at a time, and analyze signal amplitudes for each read back signal, over the frequency range corresponding to the natural vibrations that may occur in a flexure due to slider/disk contact. The natural frequencies of flexure vibrations are determined empirically for the type of flexure used in the disk drive 20, and used to set the frequency range for demodulation and spectrum analysis.

Figure 3:
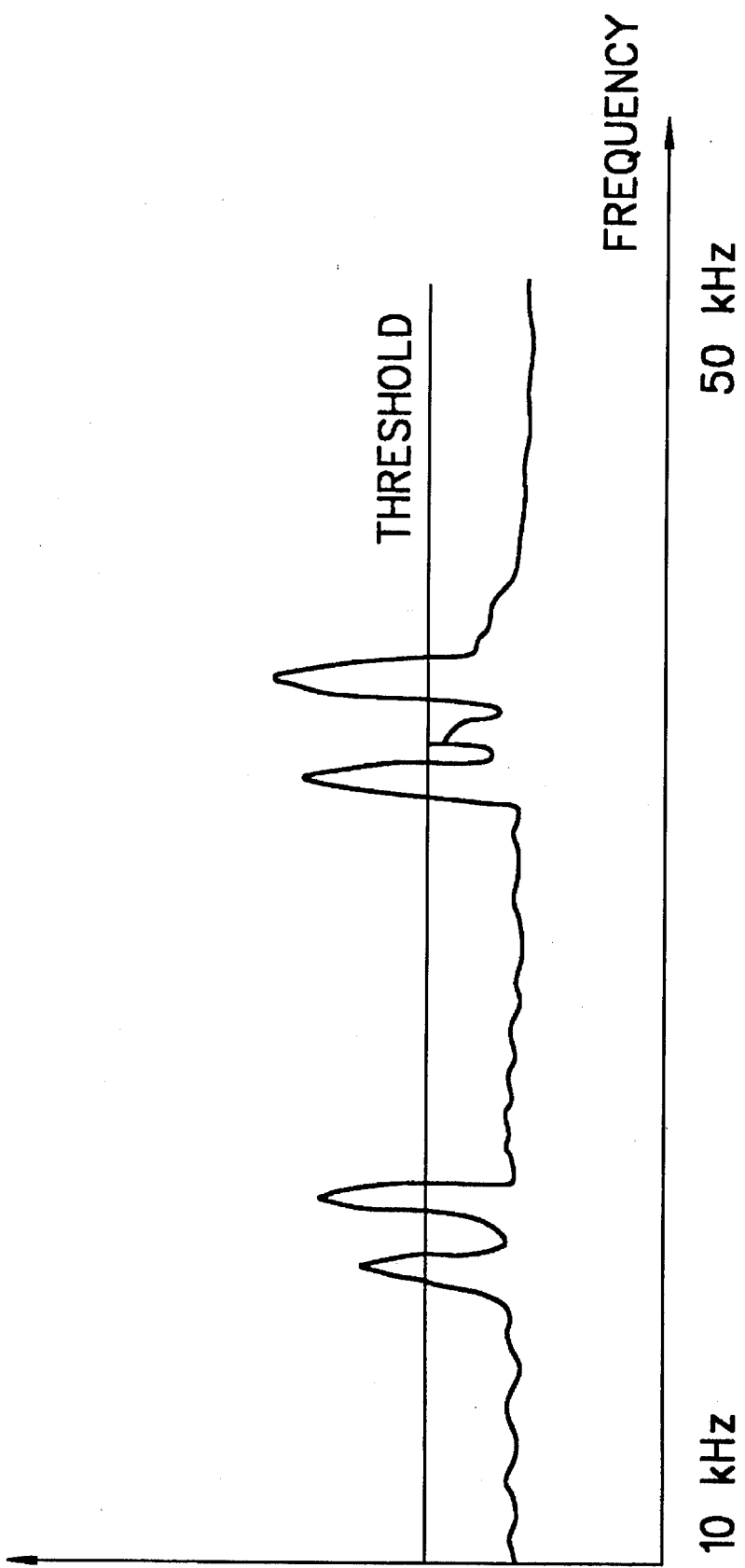
FIG. 3 is a graph illustrating a spectrum of frequencies showing frequency jitter caused by slider/disk contact.

FIG. 3 shows an example of a frequency spectrum, as analyzed by the spectrum analyzer. Throughout a frequency spectrum of from, e.g., 10K Hz to 50 k hz, there is a low level noise from the FM demodulator 44. A threshold envelope is set at an amplitude or amplitudes that are sufficiently higher than the average level for the noise amplitude to insure that accurate indications of slider/disk contact are obtained. The example of FIG. 3 shows a threshold envelope set at a constant value across the frequency spectrum. However, the value of the threshold at any particular frequency can be set at a level appropriate for that frequency.

Whenever slider/disk contact occurs, the amplitude of the various frequencies corresponding to the flexure vibration peak sharply above the threshold. The precise frequencies of vibration varies from drive head to drive head due to manufacturing tolerances and other factors distinctive to a particular head structure. By using a spectrum analysis over a bandwidth that covers the full range of possible flexure vibrations, it is not necessary to know which precise frequencies will correspond to flexure vibration for any particular slider/disk interface.

According to a feature of the present invention, the spectrum analyzer 50 comprises a processor performing a fast Fourier transformation of the FM demodulated read back signals. A fast Fourier transformation can be performed at much higher speeds than a conventional spectrum analyzer and the results from one revolution of read back are reliable enough for accurately detecting contact. In addition, the discontinuity can be ignored in the analysis.

Each amplitude detected in the spectrum analysis is compared in the peak detector 56 to the threshold value. As noted above, the threshold value at any particular frequency is set relevant to the level of noise in the FM demodulated signals. As shown in the graph of FIG. 3, the amplitude of noise from a conventional FM demodulator is insignificant compared to the amplitude of noise from mechanical vibrations. A conventional FM demodulator of the type typically used in FM radios provides a detection sensitivity of approximately 0.08 μm/s.

If any signal amplitude of any of the read back signals exceeds the threshold value, this indicates flexure vibrations caused by slider/disk contact, and the drive is rejected. The peak detector 56 is operated to indicate which read back signal or signals had signal amplitudes that exceeded the threshold value so that the particular heads 24a–h failing to begin fly height operation by the desired take off velocity, are identified. Inasmuch as the test according to the present invention is conducted prior to assembly of the PCB 34 and housing, an identification of heads that do not comply with the desired take off velocity can be repaired or replaced more conveniently than when a defect is discovered in a completed disk drive product.

When the test system of FIG. 2 is used in a laboratory mode, the disk drive 20 will comprise a prototype of a disk drive design. To determine a take off velocity, the periodic signal is written on one or more of the heads 24a–h, at a first rotational velocity that is sufficiently above the take off velocity to achieve fly height operation of the heads 24a–h. The rotational velocity is then decreased, either in discrete steps or continuously, and the FM demodulator is operated to follow the read back signal until there is an indication of slider/disk contact in the spectrum analysis. The rotational velocity at a first indication of contact for any particular head 24 corresponds to the take off velocity for that head 24.

To determine the pattern of contact, the periodic signal is written for each head to be tested at a first rotational velocity where contact is known to occur. The written signal is then read back at a second rotational velocity that reduces or stops contact. The output of the FM demodulation and spectrum analysis provides information on the nature of the contact of the head under test.

To observe deterioration of the slider/disk interface for any particular head 24, write the periodic signal at a first rotational velocity where there is minimal noise, e.g. at a rotational velocity sufficient to achieve fly height operation. Thereafter reduce the rotational velocity to a value of interest, e.g. at the onset of slider/disk contact, and continuously monitor the FM modulation. The deterioration analysis can be performed simultaneously with a strain gauge test to compare magnetic and mechanical deterioration of the slider/disk interface.

I claim:

1. A method for testing slider/disk contact in a disk drive comprising a rotating disk and a head mounted by an actuator for selective positioning of the head over the disk, the head having a slider, and a flexure for attaching the head to the actuator, comprising the steps of:

rotating the disk of the disk drive at a first preselected rotational velocity;

using the head of the disk drive to write a signal having a substantially uniform pattern on the disk as it rotates;

thereafter rotating the disk at a second preselected rotational velocity;

while rotating at the second preselected rotational velocity, using the head to read back the signal written at the first preselected rotational velocity;

performing an FM demodulation of the read back signal through a frequency range corresponding to a range of natural frequencies of vibration of the flexure caused by slider/disk contact; and analyzing the demodulated read back signal to detect frequency jitter indicating the presence of flexure vibration, thereby evidencing head-disc contact during rotation of the disc at said first or second velocity.

2. The method of claim 1 wherein the first preselected rotational velocity is set at a value that is greater than the second preselected rotational velocity.

3. The method of claim 1 wherein the second preselected rotational velocity is set at a value that is greater than the first preselected rotational velocity.

4. The method of either one of claims 2 and 3 wherein one of the first and second rotational velocities is set to be approximately equal to a desired take off velocity of the head, and the other of the first and second rotational velocities is set to a higher rotational velocity, such that the FM demodulation of the read back signal indicates whether slider/disk contact exists at the take off velocity.

5. The method of claim 1 wherein the first rotational velocity is set at a value where the slider contacts the disk, and the second rotational velocity is greater than the first rotational velocity, such that the FM demodulation of the read back signal indicates a pattern of slider/disk contact.

6. The method of claim 1 wherein the first rotational velocity is set at a value where the slider does not contact the disk, and the second rotational velocity includes a velocity at which slider/disk contact first occurs, such that the FM demodulation of the read back signal indicates a rotational velocity at the first occurrence of slider/disk contact.

7. The method of claim 1 wherein the first rotational velocity is set at a value where the slider does not contact the disk and the second preselected rotational velocity is set at a value where slider/disk contact occurs, wherein the step of using the head to read back the signal written at the first preselected rotational velocity is carried out continuously for a set time period, and comprising the further step of:

continuing to perform FM demodulation of the read back signal while continuously reading back the written signal, such that the FM demodulation of the read back signal indicates deterioration of the slider/disk contact.

8. A method for testing slider/disk contact in a disk drive comprising a rotating disk and a head mounted by an actuator for selective positioning of the head over the disk, the head having a slider, comprising the steps of:

rotating the disk of the disk drive at a first preselected rotational velocity;

using the head of the disk drive to write a signal having a substantially uniform pattern on the disk as it rotates;

thereafter rotating the disk at a second preselected rotational velocity;

while rotating at the second preselected rotational velocity, using the head to read back the signal written at the first preselected rotational velocity;

performing an FM demodulation of the read back signal through a frequency range corresponding to a range of natural frequencies of vibration caused by slider/disk contact; and performing a spectrum analysis of the FM demodulation to determine amplitudes of frequency components of the demodulated read back signal caused by slider/disk contact.

9. The method of claim 8 wherein the step of performing a spectrum analysis of the FM demodulation is carried out by performing a Fourier transformation of the FM demodulation.

10. The method of claim 9 wherein the step of performing the Fourier transformation of the FM demodulation is carried out by performing a fast Fourier transformation of the FM demodulation.

11. The method of claim 8 wherein the step of using the head of the disk drive to write a signal results in a discontinuity of the written signal and the step of performing an FM demodulation of the read back signal is carried out by omitting the discontinuity from the FM demodulation.

12. The method of claim 8 wherein the first preselected rotational velocity set at a value that is greater than the second preselected rotational velocity.

13. The method of claim 8 wherein the second preselected rotational velocity is set at a value that is greater than the first preselected rotational velocity.

14. The method of either one of claims 12 and 13 wherein one of the first and second rotational velocities is set to be approximately equal to a desired take off velocity of the head, and the other of the first and second rotational velocities is set at a higher rotational velocity, such that the spectrum analysis of the read back signal indicates whether slider/disk contact exists at the take off velocity.

15. The method of claim 8 wherein the first rotational velocity is set at a value where the slider contacts the disk, and the second rotational velocity is greater than the first rotational velocity, such that the spectrum analysis of the read back signal indicates a pattern of slider/disk contact.

16. The method of claim 8 wherein the first rotational velocity is set at a value where the slider does not contact the disk, and the second rotational velocity includes a velocity at which slider/disk contact first occurs, such that the spectrum analysis of the read back signal indicates a rotational velocity at the first occurrence of slider/disk contact.

17. The method of claim 8 wherein the first rotational velocity is set at a value where the slider does not contact the disk and the second preselected rotational velocity is set at a value where slider/disk contact occurs, wherein the step of using the head to read back the signal written at the first preselected rotational velocity is carried out continuously for a set time period, and comprising the further steps of:

continuing to perform FM demodulation of the read back signal while continuously reading back the written signal; and continuing to perform the spectrum analysis while continuing to perform the FM demodulation, such that the spectrum analysis of the read back signal indicates deterioration of the slider/disk contact.

18. A method for testing a disk drive to determine whether the disk drive has an acceptable take off velocity, comprising the steps of:

providing a disk drive comprising a rotating disk and a head mounted by an actuator for selective positioning of the head over the disk, the head having a slider, and a flexure for attaching the head to the actuator;

coupling the disk drive to a control device operable to control rotation of the disk, movement of the actuator to selectively position the head over the disk and to control the head to write a signal on the disk and to read the signal back from the disk;

operating the control device to rotate the disk at a first preselected rotational velocity;

operating the control device to cause the head to write a signal having a substantially uniform pattern on the disk as it rotates;

thereafter operating the control device to rotate the disk at a second preselected rotational velocity;

while rotating at the second preselected rotational velocity, operating the control device to cause the head to read back the signal written at the first preselected rotational velocity;

providing an FM demodulator arranged to receive the read back signal from the head; and using the FM demodulator to perform an FM demodulation of the read back signal through a frequency range corresponding to a range of natural frequencies of vibration of the flexure caused by slider/disk contact;

analyzing the demodulated read back signal to detect said natural frequencies of vibration of the flexure caused by slider/disc contact;

wherein one of the first and second rotational velocities is set to be approximately equal to a desired take off velocity of the head, such that the FM demodulation and analysis of the read back signal indicates whether slider/disk contact exists at the take off velocity.

19. The method of claim 18 comprising the further steps of:

providing a spectrum analyzer; and using the spectrum analyzer to perform a spectrum analysis of the FM demodulation to determine amplitudes of frequency components of the demodulated read back signal caused by slider/disk contact.

20. The method of claim 19 comprising the further steps of:

providing a peak detector arranged to receive the amplitudes; and operating the peak detector to compare the amplitudes to a threshold value and to indicate rejection of the disk drive when any amplitude exceeds the threshold value.

21. A method for providing pattern information of slider/disk contact in a disk drive comprising the steps of:

providing a disk drive comprising a rotating disk and a head mounted by an actuator for selective positioning of the head over the disk, the head having a slider, and a flexure for attaching the head to the actuator;

coupling the disk drive to a control drive operable to control rotation of the disk, movement of the actuator to selectively position the head over the disk and to control the head to write a signal on the disk and to read the signal back from the disk;

operating the control device to rotate the disk at a first preselected rotational velocity set at value where the slider contacts the disk;

operating the control device to cause the head to write a signal having a substantially uniform pattern on the disk as it rotates;

thereafter operating the control device to rotate the disk at a second preselected rotational velocity greater than the first preselected rotational velocity;

while rotating at the second preselected rotational velocity, operating the control device to cause the head to read back the signal written at the first preselected rotational velocity;

providing an FM demodulator arranged to receive the read back signal from the head; and using the FM demodulator to perform an FM demodulation of the read back signal through a frequency range corresponding to a range of natural frequencies of vibration of the flexure caused by slider/disk contact;

analyzing the demodulated read back signal to detect said natural frequencies of vibration of the flexure caused by slider/disc contact;

such that the FM demodulation and analysis of the read back signal indicates a pattern of slider/disk contact.

22. The method of claim 21 comprising the further steps of:

providing a spectrum analyzer; and using the spectrum analyzer to perform a spectrum analysis of the FM demodulation to determine amplitudes of frequency components of the demodulated read back signal caused by slider/disk contact.

23. A method for determining take off velocity of a head in a disk drive comprising the steps of:

providing a disk drive comprising a rotating disk and a head mounted by an actuator for selective positioning of the head over the disk, the head having a slider, and a flexure for attaching the head to the actuator;

coupling the disk drive to a control device operable to control rotation of the disk, movement of the actuator to selectively position the head over the disk and to control the head to write a signal on the disk and to read the signal back from the disk;

operating the control device to rotate the disk at a first preselected rotational velocity set at value where the slider does not contact the disk;

operating the control device to cause the head to write a signal having a substantially uniform pattern on the disk as it rotates;

thereafter operating the control device to rotate the disk at a second preselected rotational velocity that includes a velocity at which slider/disk contact first occurs;

while rotating at the second preselected rotational velocity, operating the control device to cause the head to read back the signal written at the first preselected rotational velocity;

providing an FM demodulator arranged to receive the read back signal from the head; and using the FM demodulator to perform an FM demodulation of the read back signal through a frequency range corresponding to a range of natural frequencies of vibration of the flexure caused by slider/disk contact;

analyzing the demodulated read back signal to detect said natural frequencies of vibration of the flexure caused by slider/disc contact;

such that the FM demodulation and analysis of the read back signal indicates a rotational velocity at the first occurrence of slider/disk contact.

24. The method of claim 23 comprising the further steps of:

providing a spectrum analyzer; and using the spectrum analyzer to perform a spectrum analysis of the FM demodulation to determine amplitudes of frequency components of the demodulated read back signal caused by slider/disk contact.

25. A method for determining deterioration of a slider/disk contact in a disk drive, comprising the steps of:

providing a disk drive comprising a rotating disk and a head mounted by an actuator for selective positioning of the head over the disk, the head having a slider, and a flexure for attaching the head to the actuator;

coupling the disk drive to a control device operable to control rotation of the disk, movement of the actuator to selectively position the head over the disk and to control the head to write a signal on the disk and to read the signal back from the disk;

operating the control device to rotate the disk at a first preselected rotational velocity;

operating the control device to cause the head to write a signal having a substantially uniform pattern on the disk as it rotates;

thereafter operating the control device to rotate the disk at a second preselected rotational velocity;

while rotating at the second preselected rotational velocity, operating the control device to cause the head to read back the signal written at the first preselected rotational velocity;

providing an FM demodulator arranged to receive the read back signal from the head; and using the FM demodulator to perform an FM demodulation of the read back signal through a frequency range corresponding to a range of natural frequencies of vibration of the flexure caused by slider/disk contact;

wherein the first rotational velocity is set at a value where the slider does not contact the disk and the second preselected rotational velocity is set at a value where slider/disk contact occurs, wherein the step of causing the head to read back the signal written at the first preselected rotational velocity is carried out continuously for a set time period, and comprising the further step of:

continuing to use the FM demodulator for FM demodulation of the read back signal while continuously reading; and analyzing the demodulated read back signal to detect said natural frequencies of vibration of the flexure caused by slider/disc contact;

such that the FM demodulation and analysis of the read back signal indicates deterioration of the slider/disk contact.

26. A method for testing a disk drive to determine whether the disk drive has an acceptable take off velocity, comprising the steps of:

providing a disk drive comprising a rotating disk and a head mounted by an actuator for selective positioning of the head over the disk, the head having a slider, and a flexure for attaching the head to the actuator;

coupling the disk drive to a control device operable to control rotation of the disk, movement of the actuator to selectively position the head over the disk and to control the head to write a signal on the disk and to read the signal back from the disk;

operating the control device to rotate the disk at a first preselected rotational velocity;

operating the control device to cause the head to write a signal having a substantially uniform pattern on the disk as it rotates;

thereafter operating the control device to rotate the disk at a second preselected rotational velocity;

while rotating at the second preselected rotational velocity, operating the control device to cause the head to read back the signal written at the first preselected rotational velocity;

providing an FM demodulator arranged to receive the read back signal from the head; and using the FM demodulator to perform an FM demodulation of the read back signal through a frequency range corresponding to a range of natural frequencies of vibration of the flexure caused by slider/disk contact;

analyzing the demodulated read back signal to detect frequency jitter indicating the presence of flexure vibration, thereby evidencing head-disc contact during rotation of the disc at said first or second velocity;

wherein one of the first and second rotational velocities is set to be approximately equal to a desired take off velocity of the head, such that the FM demodulation of the read back signal indicates whether slider/disk contact exists at the take off velocity.

27. A method as claimed in claim 1 wherein said analyzing step includes detecting signals above a threshold amplitude within a frequency range corresponding to said frequencies of flexure vibration caused by slider/disc contact.

* * * * *